United States Patent
Jeffery et al.

(10) Patent No.: US 8,774,150 B1
(45) Date of Patent: Jul. 8, 2014

(54) SYSTEM AND METHOD FOR REDUCING SIDE-LOBE CONTAMINATION EFFECTS IN WI-FI ACCESS POINTS

(71) Applicant: Magnolia Broadband Inc., Englewood, NJ (US)

(72) Inventors: Stuart S. Jeffery, Los Altos, CA (US); Haim Harel, New York, NY (US); Phil F. Chen, Denville, NJ (US); Kenneth Kludt, San Jose, CA (US); Sherwin J. Wang, Towaco, NJ (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 13/955,320

(22) Filed: Jul. 31, 2013

Related U.S. Application Data

(60) Provisional application No. 61/764,209, filed on Feb. 13, 2013, provisional application No. 61/805,770, filed on Mar. 27, 2013, provisional application No. 61/809,054, filed on Apr. 5, 2013.

(51) Int. Cl.
*H04W 52/02* (2009.01)

(52) U.S. Cl.
USPC .......................................... 370/338

(58) Field of Classification Search
CPC ................................. H04W 52/0206
See application file for complete search history.

(56) References Cited

U.S. PATENT DOCUMENTS

| | | | |
|---|---|---|---|
| 4,044,359 A | 8/1977 | Applebaum et al. |
| 4,359,738 A | 11/1982 | Lewis |
| 4,540,985 A | 9/1985 | Clancy et al. |
| 4,628,320 A | 12/1986 | Downie |
| 5,162,805 A | 11/1992 | Cantrell |
| 5,363,104 A | 11/1994 | Richmond |
| 5,444,762 A | 8/1995 | Frey et al. |
| 5,732,075 A | 3/1998 | Tangemann et al. |
| 5,915,215 A | 6/1999 | Williams et al. |
| 5,940,033 A | 8/1999 | Locher et al. |
| 6,018,317 A | 1/2000 | Dogan et al. |
| 6,046,655 A | 4/2000 | Cipolla |

(Continued)

FOREIGN PATENT DOCUMENTS

| | | |
|---|---|---|
| EP | 1 867 177 | 5/2010 |
| EP | 2 234 355 | 9/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Jianye Wu
(74) *Attorney, Agent, or Firm* — Pearl Cohen Zedek Latzer Baratz LLP

(57) ABSTRACT

A multibeam access point may include a plurality of co-located, beamforming transceivers, each configured to transmit data to a user equipment on a first channel. The multibeam access point may further include a cluster transceiver co-located with the beamforming transceivers, configured to transmit data to the user equipment on a second channel. A processor or controller may monitor whether at least two of the beamforming transceivers have detected data transmission from the user equipment. Based on the monitoring, the processor may allow the cluster transceiver to transmit data to the user equipment.

22 Claims, 11 Drawing Sheets

(56) References Cited

U.S. PATENT DOCUMENTS

| | | | |
|---|---|---|---|
| 6,101,399 A | 8/2000 | Raleigh et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,297,772 B1 | 10/2001 | Lewis | |
| 6,321,077 B1 | 11/2001 | Saitoh et al. | |
| 6,377,783 B1 | 4/2002 | Lo et al. | |
| 6,584,115 B1 | 6/2003 | Suzuki | |
| 6,697,633 B1 | 2/2004 | Dogan et al. | |
| 6,834,073 B1 | 12/2004 | Miller et al. | |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,257,425 B2 | 8/2007 | Wang et al. | |
| 7,299,072 B2 * | 11/2007 | Ninomiya | 455/562.1 |
| 7,392,015 B1 | 6/2008 | Farlow et al. | |
| 7,499,109 B2 | 3/2009 | Kim et al. | |
| 7,606,528 B2 | 10/2009 | Mesecher | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 8,078,109 B1 | 12/2011 | Mulcay | |
| 8,115,679 B2 | 2/2012 | Falk | |
| 8,155,613 B2 | 4/2012 | Kent et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,599,979 B2 | 12/2013 | Farag et al. | |
| 2001/0029326 A1 | 10/2001 | Diab et al. | |
| 2001/0038665 A1 | 11/2001 | Baltersee et al. | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2003/0114162 A1 | 6/2003 | Chheda et al. | |
| 2003/0153322 A1 | 8/2003 | Burke et al. | |
| 2003/0203717 A1 | 10/2003 | Chuprun et al. | |
| 2004/0056795 A1 | 3/2004 | Ericson et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0166902 A1 | 8/2004 | Castellano et al. | |
| 2004/0228388 A1 | 11/2004 | Salmenkaita | |
| 2004/0235527 A1 | 11/2004 | Reudink et al. | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0245224 A1 | 11/2005 | Kurioka | |
| 2005/0287962 A1 | 12/2005 | Mehta et al. | |
| 2006/0094372 A1 | 5/2006 | Ahn et al. | |
| 2006/0135097 A1 | 6/2006 | Wang et al. | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0285507 A1 * | 12/2006 | Kinder et al. | 370/310 |
| 2007/0093261 A1 | 4/2007 | Hou et al. | |
| 2007/0152903 A1 | 7/2007 | Lin et al. | |
| 2007/0223380 A1 | 9/2007 | Gilbert et al. | |
| 2008/0043867 A1 | 2/2008 | Blanz et al. | |
| 2008/0051037 A1 | 2/2008 | Molnar et al. | |
| 2008/0144737 A1 | 6/2008 | Naguib | |
| 2008/0238808 A1 | 10/2008 | Arita et al. | |
| 2008/0280571 A1 | 11/2008 | Rofougaran et al. | |
| 2008/0285637 A1 | 11/2008 | Liu et al. | |
| 2009/0028225 A1 | 1/2009 | Runyon et al. | |
| 2009/0046638 A1 | 2/2009 | Rappaport et al. | |
| 2009/0058724 A1 | 3/2009 | Xia et al. | |
| 2009/0121935 A1 | 5/2009 | Xia et al. | |
| 2009/0154419 A1 | 6/2009 | Yoshida et al. | |
| 2009/0190541 A1 * | 7/2009 | Abedi | 370/329 |
| 2009/0268616 A1 | 10/2009 | Hosomi | |
| 2009/0322610 A1 | 12/2009 | Hants et al. | |
| 2009/0322613 A1 | 12/2009 | Bala et al. | |
| 2010/0037111 A1 | 2/2010 | Ziaja et al. | |
| 2010/0040369 A1 | 2/2010 | Zhao et al. | |
| 2010/0117890 A1 | 5/2010 | Vook et al. | |
| 2010/0135420 A1 | 6/2010 | Xu et al. | |
| 2010/0150013 A1 | 6/2010 | Hara et al. | |
| 2010/0172429 A1 | 7/2010 | Nagahama et al. | |
| 2010/0195560 A1 | 8/2010 | Nozaki et al. | |
| 2010/0234071 A1 | 9/2010 | Shabtay et al. | |
| 2010/0278063 A1 | 11/2010 | Kim et al. | |
| 2010/0283692 A1 | 11/2010 | Achour et al. | |
| 2010/0285752 A1 | 11/2010 | Lakshmanan et al. | |
| 2010/0303170 A1 | 12/2010 | Zhu et al. | |
| 2010/0316043 A1 | 12/2010 | Doi et al. | |
| 2011/0019639 A1 | 1/2011 | Karaoguz et al. | |
| 2011/0032849 A1 | 2/2011 | Yeung et al. | |
| 2011/0032972 A1 | 2/2011 | Wang et al. | |
| 2011/0105036 A1 | 5/2011 | Rao et al. | |
| 2011/0150050 A1 | 6/2011 | Trigui et al. | |
| 2011/0150066 A1 | 6/2011 | Fujimoto | |
| 2011/0163913 A1 | 7/2011 | Cohen et al. | |
| 2011/0205883 A1 | 8/2011 | Mihota | |
| 2011/0249576 A1 | 10/2011 | Chrisikos et al. | |
| 2011/0273977 A1 | 11/2011 | Shapira et al. | |
| 2011/0281541 A1 | 11/2011 | Borremans | |
| 2011/0299437 A1 | 12/2011 | Mikhemar et al. | |
| 2012/0014377 A1 | 1/2012 | Joergensen et al. | |
| 2012/0015603 A1 | 1/2012 | Proctor et al. | |
| 2012/0020396 A1 | 1/2012 | Hohne et al. | |
| 2012/0033761 A1 | 2/2012 | Guo et al. | |
| 2012/0034952 A1 | 2/2012 | Lo et al. | |
| 2012/0045003 A1 | 2/2012 | Li et al. | |
| 2012/0064838 A1 | 3/2012 | Miao et al. | |
| 2012/0076028 A1 | 3/2012 | Ko et al. | |
| 2012/0170672 A1 | 7/2012 | Sondur | |
| 2012/0201153 A1 | 8/2012 | Bharadia et al. | |
| 2012/0201173 A1 | 8/2012 | Jain et al. | |
| 2012/0207256 A1 | 8/2012 | Farag et al. | |
| 2012/0212372 A1 | 8/2012 | Petersson et al. | |
| 2012/0218962 A1 | 8/2012 | Kishiyama et al. | |
| 2012/0220331 A1 | 8/2012 | Luo et al. | |
| 2012/0230380 A1 * | 9/2012 | Keusgen et al. | 375/227 |
| 2012/0251031 A1 | 10/2012 | Suarez et al. | |
| 2012/0270544 A1 | 10/2012 | Shah | |
| 2012/0314570 A1 | 12/2012 | Forenza et al. | |
| 2013/0023225 A1 | 1/2013 | Weber | |
| 2013/0051283 A1 | 2/2013 | Lee et al. | |
| 2013/0070741 A1 | 3/2013 | Li et al. | |
| 2013/0079048 A1 | 3/2013 | Cai et al. | |
| 2013/0094621 A1 | 4/2013 | Luo et al. | |
| 2013/0101073 A1 | 4/2013 | Zai et al. | |
| 2013/0156120 A1 | 6/2013 | Josiam et al. | |
| 2013/0170388 A1 | 7/2013 | Ito et al. | |
| 2013/0208619 A1 | 8/2013 | Kudo et al. | |
| 2013/0223400 A1 | 8/2013 | Seo et al. | |
| 2013/0242976 A1 | 9/2013 | Katayama et al. | |
| 2013/0272437 A1 | 10/2013 | Eidson et al. | |
| 2013/0331136 A1 | 12/2013 | Yang et al. | |

FOREIGN PATENT DOCUMENTS

| | | |
|---|---|---|
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.

(56) References Cited

OTHER PUBLICATIONS

Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.

* cited by examiner

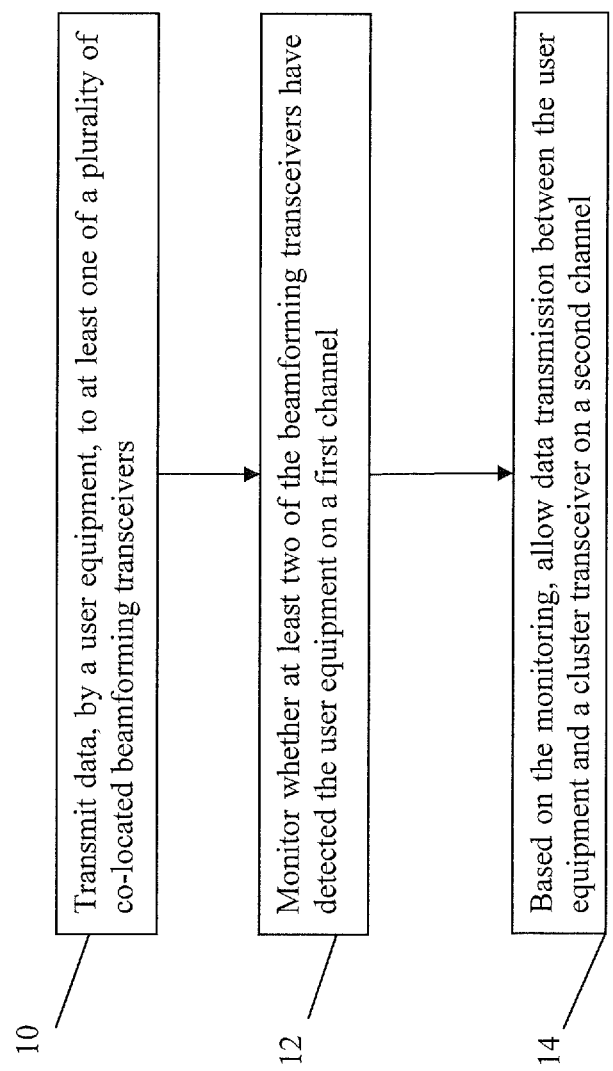

SYSTEM AND METHOD FOR REDUCING SIDE-LOBE CONTAMINATION EFFECTS IN WI-FI ACCESS POINTS

CROSS REFERENCE TO RELATED APPLICATIONS

This application claims benefit of U.S. Provisional Patent Application No. 61/764,209 filed on Feb. 13, 2013, U.S. Provisional Patent Application No. 61/805,770, filed Mar. 27, 2013, and U.S. Provisional Patent Application No. 61/809,054 filed on Apr. 5, 2013, all of which are incorporated herein by reference in its entirety.

FIELD OF THE PRESENT INVENTION

The present invention relates generally to methods of enhanced performance systems using RF beamforming and/or digital signal processing, in both MIMO and non-MIMO systems.

BACKGROUND

Active antenna systems may implement 1-dimensional and 2-dimensional multi-beam base stations that focus transmission and reception into narrow sub-sectors, facilitate reduced interference to neighboring cells, and enable reuse of the radio spectrum at its own cell by activating independent simultaneous co-channel non-overlapping beams.

Base stations may separate transmission and reception by using different frequencies or different time divisions for transmission and reception. For example, cellular protocols, such as GSM (Global System for Mobile Communications), WiMAX (Worldwide Interoperability for Microwave Access), and LTE (Long-Term Evolution), may sync (synchronize) all transmission and receiving channels using time-division. Wi-Fi base stations, which may incorporate a multi-beamforming cluster of co-located, co-channel Wi-Fi access points, may not inherently include such syncing capabilities and may operate inefficiently when in close proximity, due to the nature of the CSMA/CA (Carrier sense multiple access with collision avoidance) property of the Wi-Fi protocol. The CSMA/CA property may require yielding to all first-come Wi-Fi data transmission in order to avoid transmission collisions or jamming. Further, while co-located, co-channel Wi-Fi access points may provide super-isolation of data transmission via RF manipulation methods, side-lobe interference in adjacent beams may occur in regions nearer to the base stations. Performance may be improved if different radio channels are utilized for data transmission occurring in closer proximity to the base station.

SUMMARY

A multibeam access point may include a plurality of co-located, beamforming transceivers, each configured to transmit data to a user equipment on a first channel. The multibeam access point may further include a cluster transceiver co-located with the beamforming transceivers, configured to transmit data to the user equipment on a second channel. A processor or controller may monitor whether at least two of the beamforming transceivers have detected data transmission from the user equipment. Based on the monitoring, the processor may allow the cluster transceiver to transmit data to the user equipment by, for example, engaging in operations that require the user equipment to register on a different antenna beam and channel than the user equipment originally intended. Further, as the user equipment moves to new locations, the processor may direct the user equipment to a different antenna beam and channel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 is a flowchart of a method according to embodiments of the invention.

Figure 1B:
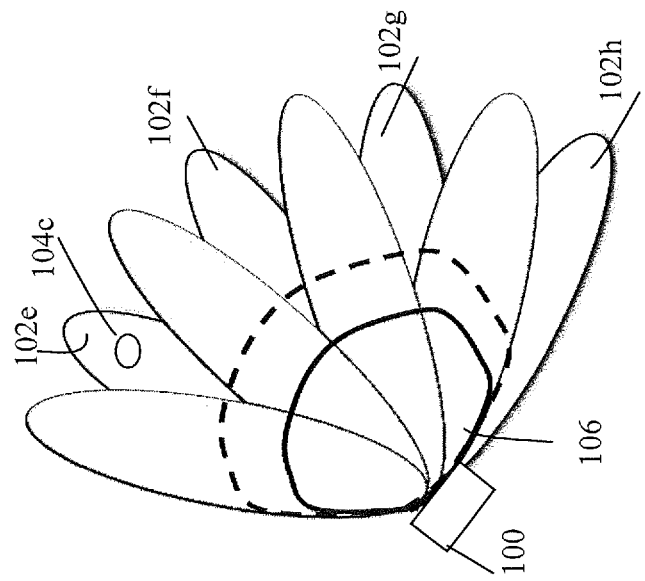
FIGS. 1A and 1B are illustrations of an antenna pattern originating from a multi-beam access point, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may be described in reference to the IEEE (Institute of Electrical and Electronics Engineer) 802.11 standard for implementing wireless local area networks (WLAN). The IEEE 802.11 standard may also be known as the Wi-Fi standard. "802.11xx" may refer to any version of the 802.11 standard, such as 802.11a, 802.11g, or 802.11ac, for example. Versions of the 802.11 standard may operate using a technique called Collision Sense Multiple Access/Collision Avoidance (CSMA/CA), a networking method which aims to prevent transmission collisions before they occur. While embodiments of the invention are described in terms of the 802.11 protocol, other network protocols built on the CSMA/CA concept may be used.

Access points (AP's) or transceivers may be grouped together or co-located on a base station to form a multi-beam access point (MBAP). As used herein, transceiver and AP may be used interchangeably as any device having independent transmit and receive functions and capable of acting as a 802.11xx access point. Further as used herein, "beamforming" may refer to the ability to direct data towards a narrow azimuth with high gain or power. Transceivers or access points may be co-located if, under ordinary usage of the CSMA/CA technique, data transmission from one transceiver prevents simultaneous data transmission from another transceiver on the same channel or frequency. The transceivers' co-location or proximity to each other may cause, for example, RF interference, a busy CCA, or an updated NAV. Co-located transceivers may be clustered or grouped together into one base station that serves UE's in a limited geographical area. Co-located transceivers may share processing tasks or may each have separate processing capabilities.

Each AP or transceiver may be coupled to an individual antenna to broadcast or transmit data to a user equipment (UE). A beamforming antenna may be a directive antenna to focus radio energy on a narrow azimuth covering an intended user on a UE. Broadcasting on a narrow azimuth may enable one or the same frequency channel (e.g., the same or overlapping frequency spectrum) to be used simultaneously or concurrently on a different azimuth beam which points to a different UE. A cluster antenna may broadcast on a wider azimuth with lower power than a beamforming antenna.

The IEEE 802.11 standard may determine which frequency channels that AP's may communicate on to minimize interference. For example, the 802.11 standard may require that AP's communicating on non-overlapping frequency channels may only transmit data at 2.4 Ghz in channels 1, 6, or 11 out of a possible 13 channels. For a cluster or group of co-located transceivers or AP's communicating on the same frequency channel, e.g., channel 1, overlapping transmission azimuths in each beam's sidelobes may cause interference between the AP's.

Figure 1A:
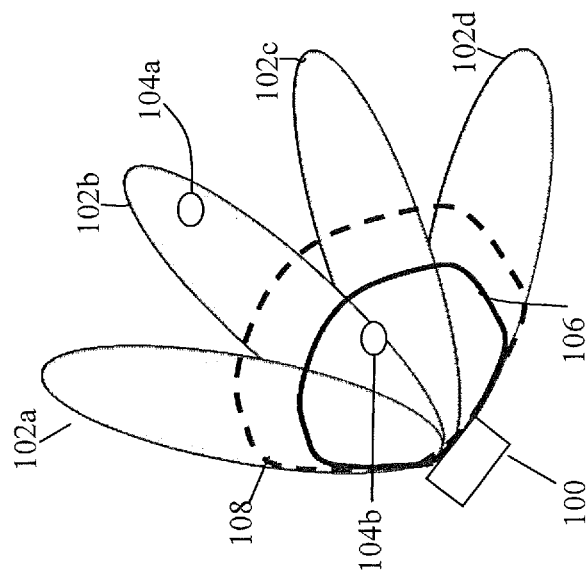
Figure 3:
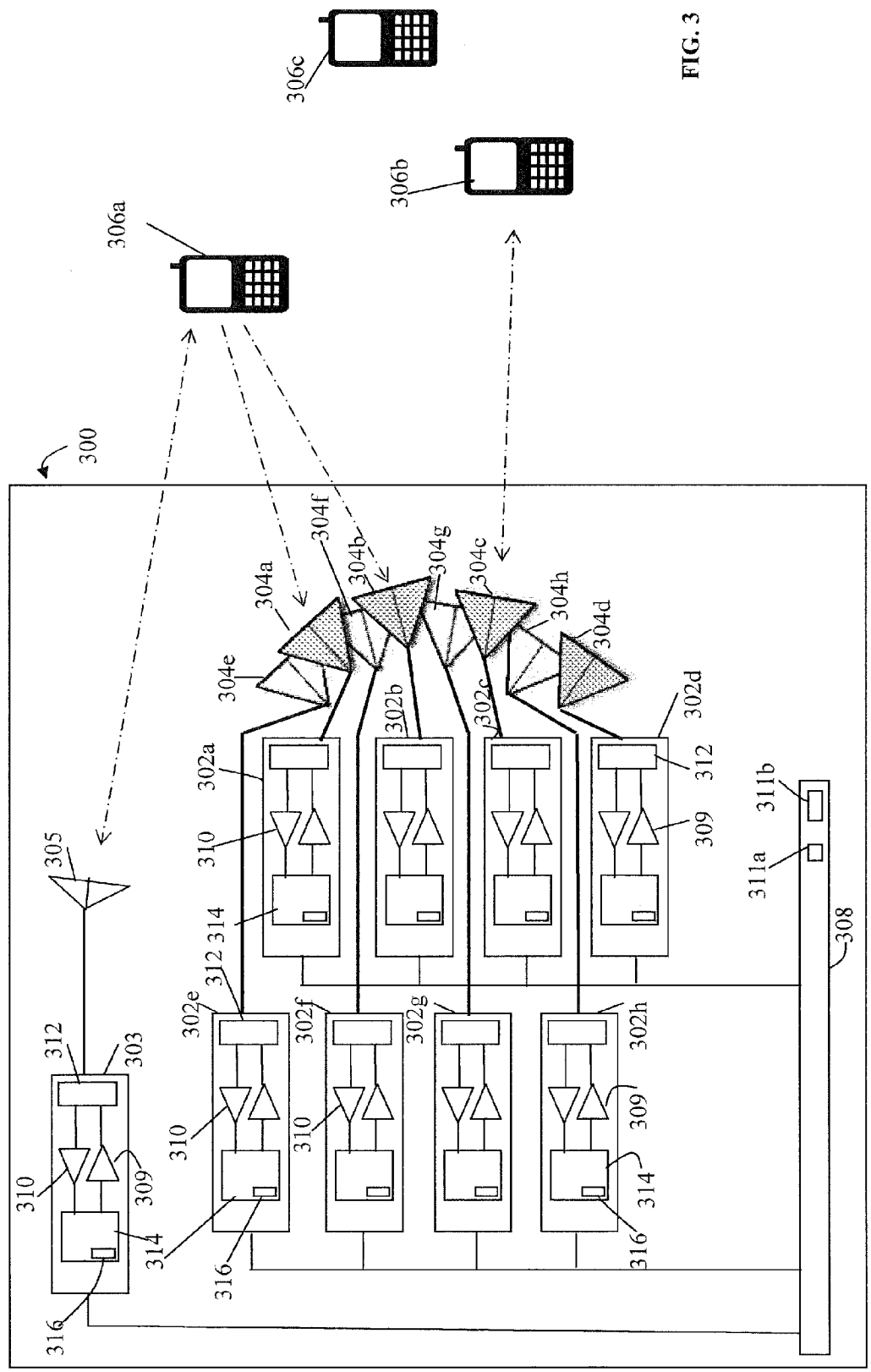
FIG. 3 is a schematic diagram of a multibeam access point, according to embodiments of the invention.

FIGS. 1A and 1B are illustrations of an antenna pattern originating from a multi-beam access point 100, according to embodiments of the invention. MBAP 100 may include a plurality of co-located beamforming transceivers or access points. (A detailed description of the MBAP 100 is illustrated in FIG. 3.) Each beam 102a-d in the antenna pattern may originate or radiate from an individual access point in the MBAP. The access points may share the same communication resources, e.g., they may communicate with a UE on the same frequency channel. While each beam 102a-d may establish an intercept contour directed toward a narrow azimuth which may contain a UE 104a, for example, interference may occur in the beams' side lobes in an area 106 near or close to MBAP 100. Each directive beam 102a-d may establish a −82 dBm (power ratio in decibels to one milliwatt) intercept contour with a typical side lobe overlap of 30 dBm. Area 106, or the side lobe contamination area (SLC area), may thus represent a −52 dBm contour. Other dBm values may be used. A UE 104b in side-lobe contamination area 106 may be detected on two beams 102b and 102c, and UE 104b may also detect transmission from both beams 102b and 102c.

Access points or transceivers that make up MBAP 100 may use a CSMA/CA wireless network, including IEEE 802.11 Wi-Fi networks. The 802.11 standard may require each access point to determine whether a radio channel is clear, prior to broadcasting or transmitting data in the channel. The AP may do this by performing a clear channel assessment (CCA), which includes two functions: listening to received energy on an RF interface (termed "energy detection"), or detecting and decoding an incoming Wi-Fi signal preamble from a nearby access point. Due to the CCA function, a UE 104b in SLC area 106 may be communicating with an access point on beam 104b, but may prevent an access point from transmitting on beam 104c using the same frequency channel. Further, UE 104b's own CCA function may prevent transmission if it detects data transmission from beam 104c. In contrast, UE 104a, located outside of SLC area 106, may not experience these interference issues due to the absence of side-lobe interference.

Embodiments of the invention may provide a system or method of detecting UE's, such as UE 104b, within SLC area 106 and communicating with co-located and co-channel beamforming access points. To avoid the interference problems described above, a controller or processor may allow UE 104b to switch to a cluster access point which may communicate on a different frequency than the beamforming access points. Since the CCA function of the 802.11 standard may detect a preamble from other access points even at a low power level, CCA detection may occur at a longer range than the SLC area 106. Embodiments of the invention may be configured to switch UE 104b to a cluster transceiver or access point at a modified SLC area 108 to account for all CCA detection areas.

According to some embodiments, shown in FIG. 1B, MBAP 100 may include a second group or plurality of beamforming access points which transmit to UE's, such as UE 104c. The second group of beamforming access points may transmit narrow azimuth beams 102e-h in a frequency channel different from beams 102a-d. The second group of beams 102e-h may also increase capacity for the MBAP 100, but may still have the problem of side-lobe contamination. MBAP 100 may include a cluster transceiver for transmitting to UE's in SLC area 106 at a frequency channel different from the frequency channel used in beams 102a-d and 102e-f.

While FIGS. 1A and 1B illustrate SLC area 106 as having a smooth line contour, the contour area may in practice be more irregular or ragged due to different propagation factors "R" over a transmission path.

Figure 2A:
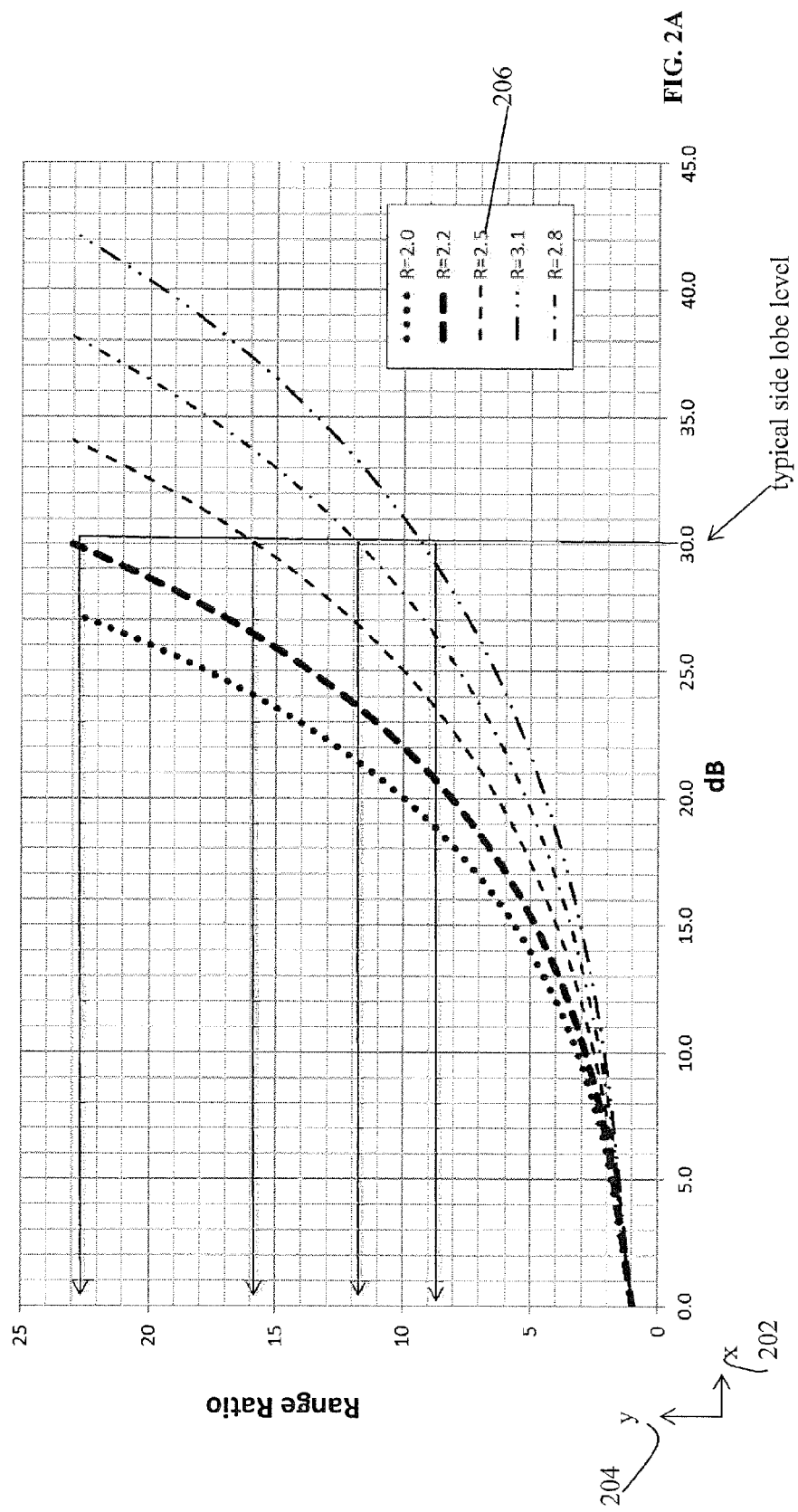
FIGS. 2A-2C are graphs that illustrate the relationship between different propagation factors, a typical side lobe level, and a side lobe contamination (SLC) area, according to embodiments of the invention.
Figure 2B:
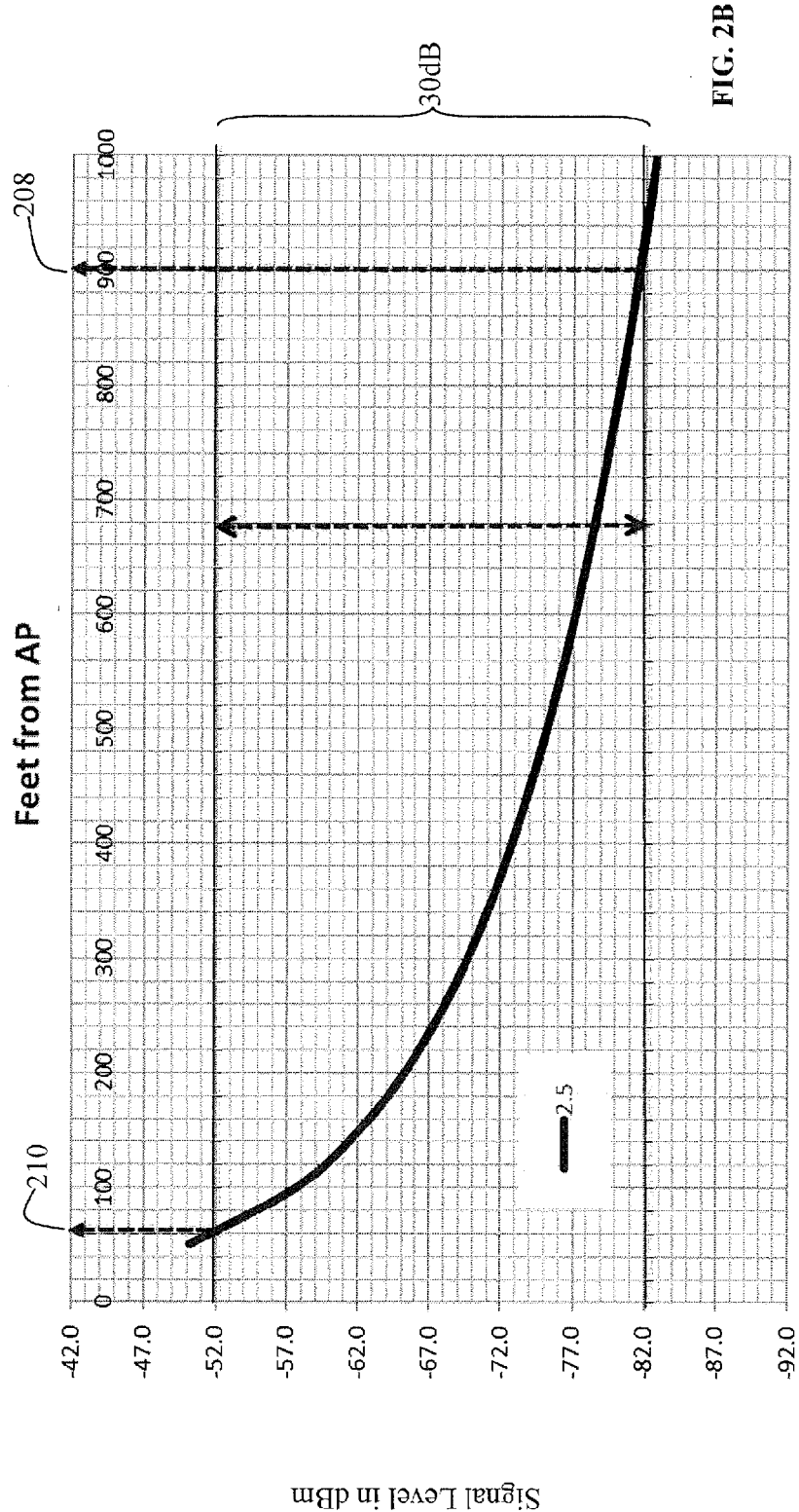
Figure 2C:
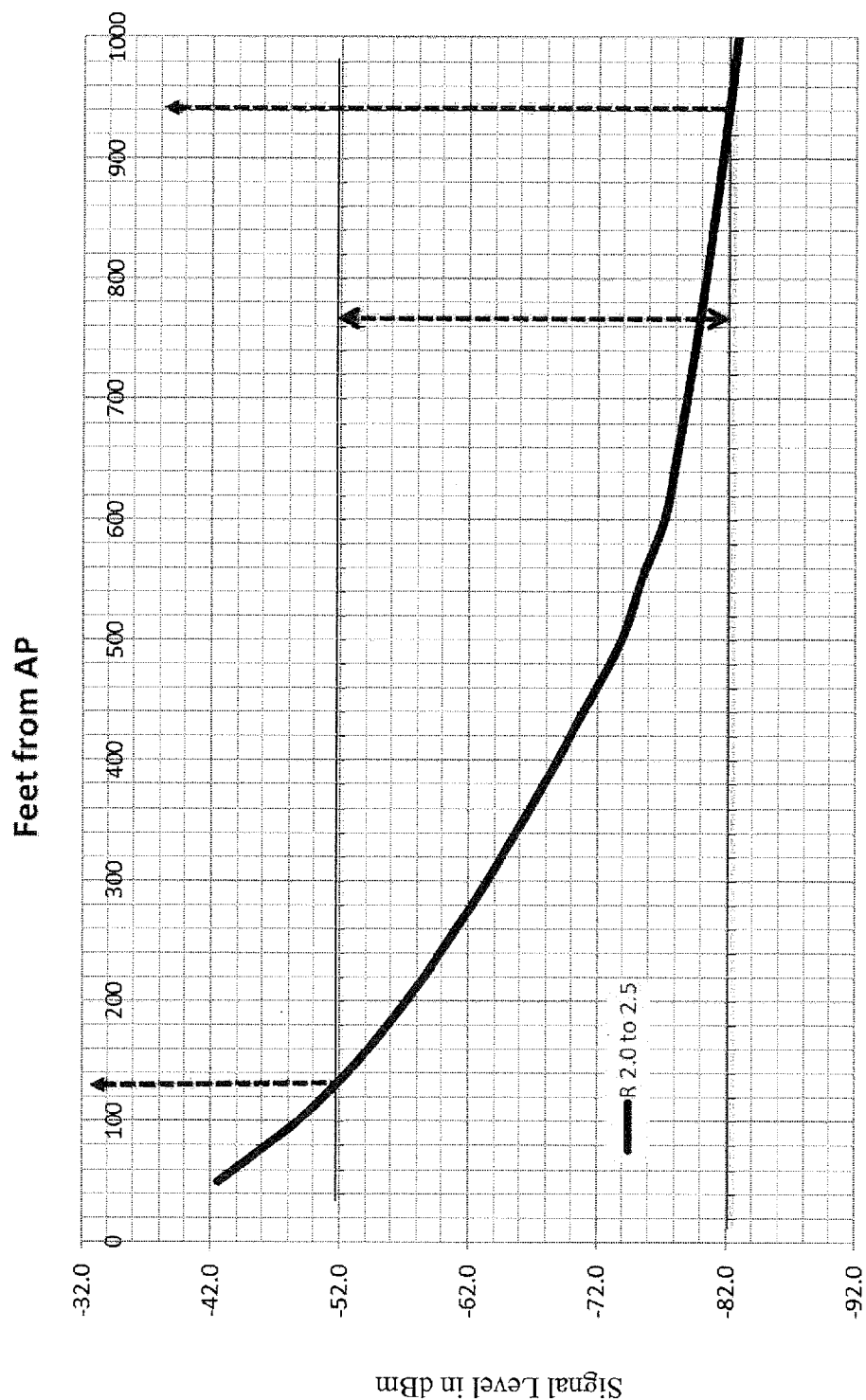

FIGS. 2A-2C are graphs that illustrate the relationship between different propagation factors and an SLC area. FIG. 2A is a graph illustrating a ratio of range varying with different values of R, according to embodiments of the invention. The ratio of range may be the ratio of the distance covered by the main beam and the distance covered by the side lobe. The x-axis 202 may represent decibels and the y-axis 204 may represent the ratio of range. The ratio of the range may change with different values of R, a factor which may adjust free space attenuation to attenuation in a more cluttered environment. At 30 dB, side-lobe level may have a reduced range, as values of R increase. For example, at an R of 2.5 206, side-lobes that are −30 dB below the main beam may have a range of about 1/16 of the main beam range. As with other examples shown herein, other or different relationships between values may be used, and other or different values may be used.

FIG. 2B is a graph illustrating signal level varying across a signal path, according to embodiments of the invention. For access points designed with a −82 dBm intercept contour, the maximum coverage of an access point may be 900 feet 208. With a side-lobe of −30 dB, the SLC area may have a −52 dBm contour and have a constant R=2.5 over the path. Under these conditions, the side-lobe range may be only about 56 feet 210 or 1/16 of the 900 foot maximum range.

FIG. 2C is an illustration of signal level varying across a signal path using real world attenuation. The real world attenuation may vary over distance and use a value for R that ranges from 2.05, nearer to an access point or transceiver, to a value of 2.5 further out several hundred feet. This may be a more realistic estimate since nearer to the AP, obstructions may be less likely while at longer ranges obstructions may increase R. In this graph, the side-lobe processing range extends out to about 125 ft or 13% of the range (125 ft/950 ft). Thus, since R is a key factor in determining SLC area, and R may change along a signal path, the size and shape of the SLC area may be more complex than shown in FIG. 1.

FIG. 3 is a schematic diagram of a multibeam access point 300, according to embodiments of the invention. Multibeam access point 300 may include a first plurality of beamforming access points or transceivers 302a-d transmitting on the same channel or frequency channel. MBAP 300 may further include a second plurality of beamforming transceivers 302e-h transmitting on a different frequency channel than transceivers 302a-d. Other MBAP's may not include a second plurality of beamforming transceivers. While four transceivers are shown for each group or plurality of transceivers, other numbers of transceivers may be included, but not less than two. Beamforming transceivers 302a-h may be configured to transmit data in a CSMA/CA protocol, such as IEEE 802.11. MBAP 300 may further include a cluster transceiver 303 to transmit data to a UE when UE is detected in a SLC area (see FIG. 1, reference 106). Cluster transceiver 303 may transmit to UE on a different frequency channel than first plurality of transceivers 302a-d and second plurality of transceivers 302e-h.

Each beamforming transceiver or access point 302a-h may be coupled to a directive antenna 304a-h, and each directive antenna 304a-h may form directive beams to transmit data to a UE 306. Cluster transceiver 303 may be coupled to a cluster antenna 305 which may form a beam covering a wider azimuth and at lower gain than the directive beams originating from directive antennas 304a-h. A UE 306 may be a cell phone, smart phone, tablet or any device with Wi-Fi capability and able to communicate with a Wi-Fi access point, or another wireless capable device. UE's 306 may be recognized in a WLAN as a Station (STA) device, according to the IEEE 802.11xx protocol. Each transceiver 302a-h and 303 may operate according to the IEEE 802.11xx protocol, or other protocol using CSMA/CA. A MBAP controller 308 may interface with or control each transceiver 302a-h and 303. MBAP controller 308 may include a processor 311a and memory 311b. The transceivers 302a-h and 303 may each include for example a transmitter 309, receiver 310, antenna interface or RF circuitry 312, and a processor 314 and memory 316, although other or different equipment may be used. Processor 314 may be a general purpose processor configured to perform embodiments of the invention for example by executing code or software stored in memory 316, or may be other processors, e.g. a dedicated processor. In other embodiments, transceivers may share a processor 314 and memory 316 to implement software.

Transceivers 302a-h and 303 may each include one or more controller(s) or processor(s) 314, respectively, for executing operations and one or more memory unit(s) 316, respectively, for storing data and/or instructions (e.g., software) executable by a processor. Processor(s) 314 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 316 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Processor(s) 314 may be general purpose processors configured to perform embodiments of the invention by for example executing code or software stored in memory, or may be other processors, e.g. dedicated processors.

According to the IEEE 802.11 protocol, channels 1, 6, and 11 may be examples of non-overlapping channels operating at 2.4 GHz. Other frequencies and frequency channels may be used. The channels may be assigned, for example, so that the first group or plurality of beamforming transceivers 302a-d transmit in channel 1, the second group or plurality of transceivers 302e-h transmit in channel 6, and cluster transceiver 303 transmits in channel 11. Other configurations may be used.

If UE 306a is located in a SLC area, for example, MBAP controller 308 or processor may monitor whether or not two or more beamforming transceivers (e.g., transceivers 302a and 302b) of the plurality or group 302a-d transmitting on the same frequency have detected UE's presence or activity. UE's presence or activity may be determined or detected by, for example, receiving a registration request. Based on the monitoring, MBAP controller 308 may allow cluster transceiver 303 to transmit data to the UE 306a by, for example, sending control signals to transceivers 302a and 302b instructing them to reject registration of UE 306a. MBAP controller may monitor other activity between transceivers 302a-h and UE to determine whether to allow UE to switch to data transmission with cluster transceiver 303. Other kinds of activity or data may be monitored to determine whether at least two beamforming transceivers have detected UE 306a. In another embodiment, for example, MBAP controller 308 may track or store UE's 306 activity over time. MBAP controller 308 may track a number of times in a predetermined time period that at least two of the beamforming transceivers have detected data transmission from UE 306a. For example, if MBAP controller 308 determines that at least two beamforming transceivers receive or sense a registration request (or other kinds of activity or data) from UE 306a at a threshold number of times in one time period (e.g., 1 second, 200 milliseconds), then MBAP controller 308 may compel UE 306a to register with a different antenna beam and channel by re-registering UE 306a.

If a UE 306b is not in SLC area, for example, MBAP controller 308 may determine that two or more beamforming transceivers have not detected UE 306b and MBAP controller 308 may not take steps to allow cluster transceiver 303 to transmit data with UE 306b. For example, only one beamforming transceiver, e.g., 304c may detect UE 306b, and MBAP controller 308 may allow data transmission between UE and the one beamforming transceiver 304c to continue or may accept UE's registration with the one beamforming transceiver 304c. If MBAP controller 308 determines that no beamforming transceivers 302a-h can detect a UE 306c, then UE 306c may be entirely out of the geographic range of the MBAP 300. While the above example was described in reference to the first plurality of beamforming transceivers 302a-d on a first channel, the above example would also apply to the second plurality of beamforming transceivers 302e-h transmitting on a second channel.

MBAP controller 308 may allow cluster transceiver 303 to transmit data to UE 306a by, for example, rejecting a registration request by UE 306a to beamforming transceiver 304a or 304b. Rejecting registration of UE to allow cluster transceiver to transmit data to UE may be implemented for example in the following manner. Transceivers 302a-h may use the same ESS (Extended Service Set), by using the same Service Set Identification (SSID), e.g., primary SSID "A". Cluster transceiver 303 on channel 11 may use a second SSID, e.g., secondary SSID "B". Thus, beamforming transceivers 304a-b may each maintain a primary SSID "A", and cluster transceiver 303 may maintain or store a secondary SSID "B" in memory, e.g., memory 316. The UE 306a may distinguish each transceiver through a unique Basic Service Set Identification (BSSID) address. UEs 306 associated with MBAP 300 may be configured with both SSID "A" and SSID "B" as preferred networks. When UE is located in a SLC area, for example, MBAP controller 308 may reject UE's 306a registration request to any of beamforming transceivers 302a-h which have SSID "A". When UE 306a is rejected, UE 306a may request registration with cluster transceiver 303, which has SSID "B". MBAP 300 may be configured so that UE 306a obtains exactly the same service and uses the authentication credentials on both the primary and secondary SSID. MBAP 300 may be capable of fast roaming according to IEEE 802.11r so that UE's 306a transitions between primary and secondary SSIDs may occur faster and with less user disruption for UE's 306a that are also 802.11r capable.

Figure 4:
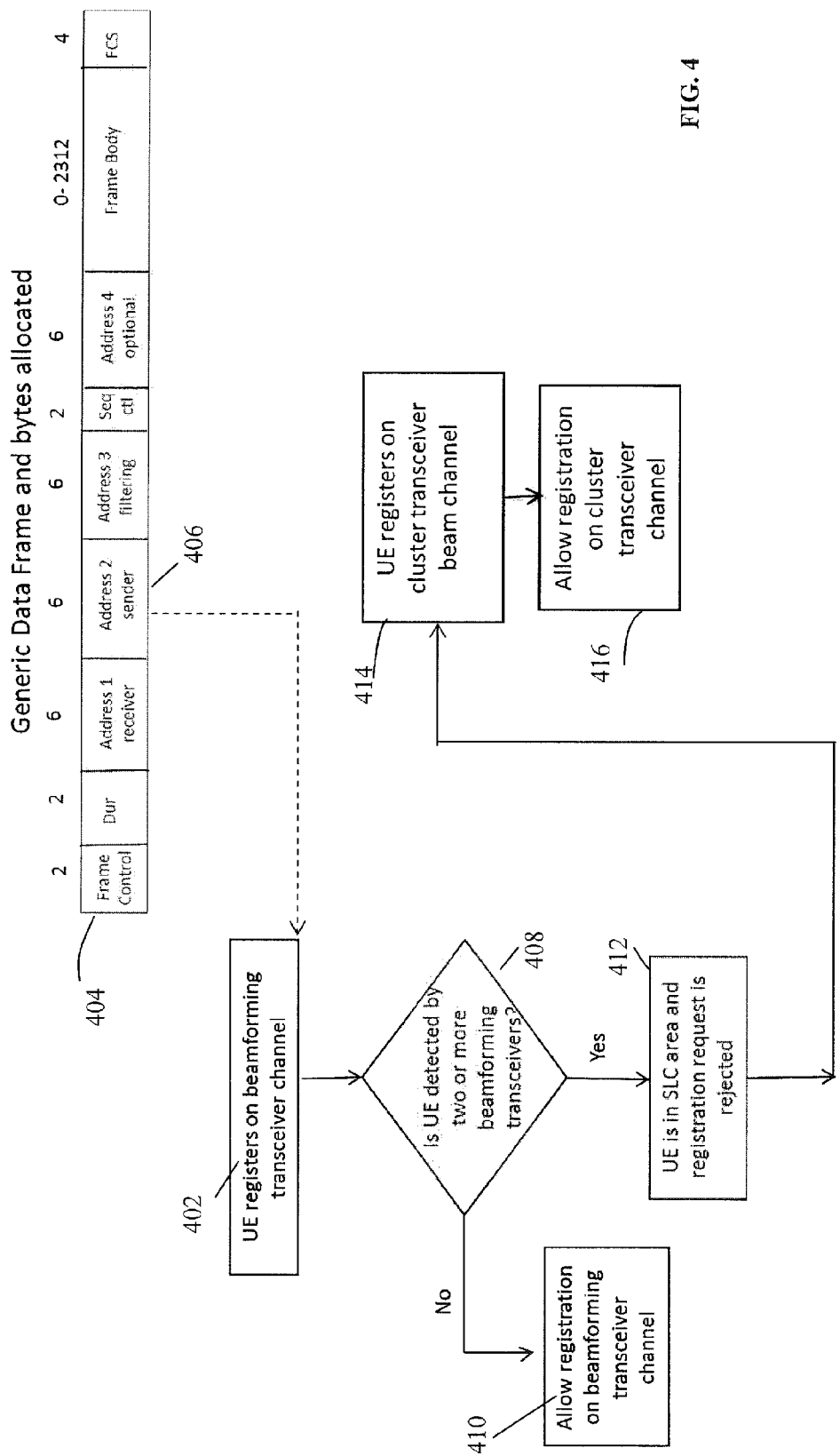
FIG. 4 is a flowchart of a method for rejecting UE requests, according to an embodiment of the invention.

FIG. 4 is a flowchart of a method for rejecting UE requests, according to an embodiment of the invention. In operation 402, when a UE attempts to register on a beamforming transceiver, the UE may do so by sending a data frame, shown in a generic format 404, according to the specifications of IEEE 802.11, for example. A generic data frame 404 may be in a standardized data format so that transceivers and UE's understand when to expect certain kinds of information. In a generic data frame 404, six bytes may be allocated for a MAC (Media Access Control) address from a sender 406 of the generic data frame 404. Beamforming transceivers (e.g., reference 302 a-h in FIG. 3) may listen for a generic data frame 404 from the UE due to the CSMA/MA properties of the 802.11 protocol. In operation 408, a MBAP controller (e.g., 308 in FIG. 3) may determine if UE is detected by two or more beamforming transceivers by determining if two or more beamforming transceivers receive or sense a registration request from the UE in a SLC area. The MBAP controller may log or track whether a beamforming transceiver receives a generic data frame with a sender address that is the same as the UE. If the MBAP controller determines that UE is detected on multiple beams, MBAP controller may direct a beamforming transceiver to reject UE's registration request in operation 412. If the MBAP controller determines that UE is not detected on multiple beams, for example, if only one beamforming transceiver receives or senses UE's registration request, than in operation 410, MBAP controller may direct the beamforming transceiver to accept the UE's registration request and allow registration. In operation 414, when UE's registration request to the beamforming transceiver is rejected, UE may then attempt to register on the cluster transceiver of the MBAP. This may be because UE is programmed to prefer a primary SSID "A" and a secondary SSID "B". When UE is rejected from registration with SSID "A", UE may automatically attempt registration with secondary SSID "B", which only the cluster transceiver maintains. In operation 416, MBAP controller may allow cluster transceiver to transmit data to UE on a different frequency channel than the beamforming transceivers by accepting UE's registration request with the cluster transceiver. Alternatively, UE may initially register on primary SSID "A" with cluster transceiver, and MBAP may allow this registration as well.

Figure 5:
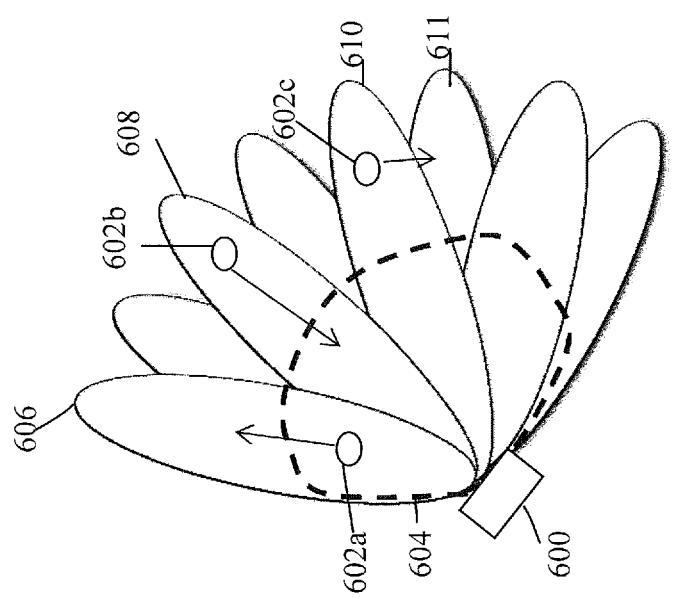
FIG. 5 is an illustration of UE movement, according to embodiments of the invention.

FIG. 5 is an illustration of UE movement in the geographical coverage of a multibeam access point 600, according to embodiments of the invention. UE 602a may, for example, start in a SLC area 604 and move outwards within a beamforming transceiver's antenna path (e.g., beam 606). In SLC area 604, UE 602a may have been initially registered on the cluster transceiver channel 11 as discussed above. As UE 602a moves outward, the signal on the cluster transceiver may decrease and UE 602a may autonomously decide to roam to another transceiver or access point, in this case the transceiver that supports beam 606. In the SLC area 604, UE 602a could have been on either primary SSID "A" or secondary SSID "B", but in either case, the MBAP network may support roaming between transceivers. Further, the MBAP 600 may be 801.11r (fast roaming) capable and if the UE is also 802.11r capable, that protocol may be used. Because of "stickiness" and the extra coverage provided by the cluster antenna, UE 602a may stay on cluster channel 11 well into the beam 606 area. The MBAP 600 may also be 802.11k capable and if UE1 is also 802.11k capable, that procedure may be used to guide UE 602a to a better access point, such as the access point broadcasting beam 606.

Another UE 602b may start operation in an area of beam 608 and move into the SLC area 604. The MBAP controller may continue to monitor all data frames from all UE being serviced by the MBAP to determine if a UE is starting to be detected by more than one access point. If detections occur on a regular basis (a period of time which can be adjusted as a tuning parameter) then UE 602b may be forced to move from a beamforming transceiver channel to the cluster transceiver channel 11. UE 602b may be inside the coverage of the cluster transceiver before it enters the SLC area 604. However, practically, these boundaries may not be sharp or smooth so the margin between the SLC area and cluster beam coverage may be provided. The margin level may be field tuned.

Another UE 602c may move laterally from one beam 610 to another beam 611. As UE 602c moves, the signal on beam 610 may decrease and at some point the UE autonomously may decide to roam to another access point, e.g., the access point that supports beam 611. This may be standard UE roaming and the MBAP may be 801.11r (fast roaming) capable so that if the UE is also 802.11r capable, that protocol will be used. Again because of "stickiness" UE 602c may stay on beam 610 for a longer duration than it should. The MBAP will also be 802.11k capable and if UE3 is also 802.11k capable, that procedure may be used to guide UE 602c to a better access point.

Figure 6:
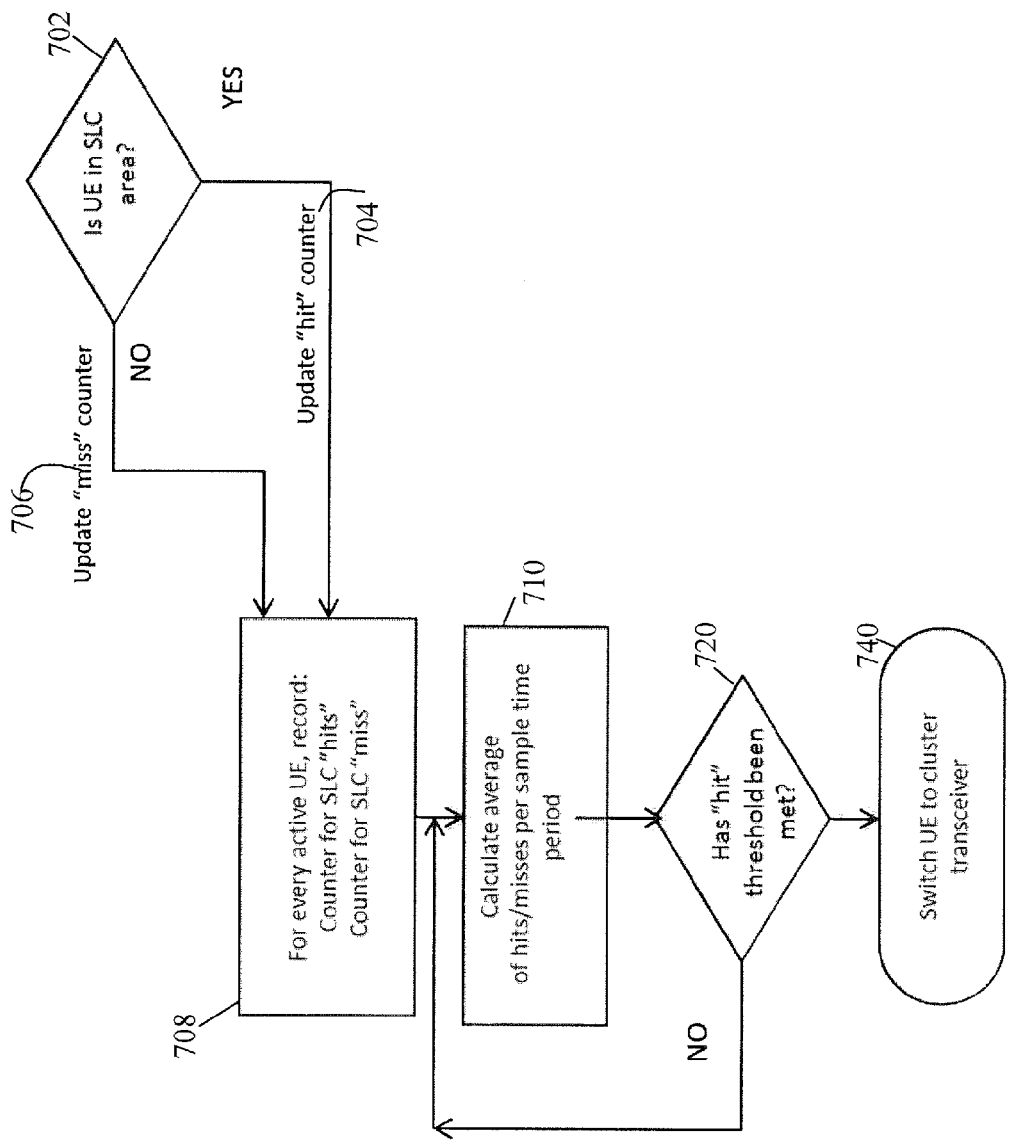
FIG. 6 is a flowchart of a method for tracking UE movement, according to embodiments of the invention.

FIG. 6 is a flowchart of a method for tracking UE movement, according to embodiments of the invention. In operation 702, every time a data frame sent by any UE registered on one of the narrow beams is received, the MBAP controller may check to see if that UE is also detected on one or more of the other associated beamforming transceivers, meaning the UE has been detected in the SLC area. Every UE that is being served by a beamforming transceiver is tracked. For every data frame sent by a UE, if UE is detected on another beam, this event may be time stamped and the "hit" counter for that UE may be incremented 704. If it is not detected, this event may be time stamped and a "miss" counter may incremented 706. In operation 708, each "hit" and "miss" is logged or tracked for every UE served by the multibeam access point.

In operation 710, the data for each UE may be analyzed to determine the statistics of "hits" and "misses" for each UE over a sample time period. In operation 720, the hit statistics may be compared to a threshold value. The length (both time of observation and number of detections) and the ratio of hits to misses may be field adjustable and may be set to cause an alarm when the a threshold of hits indicates that UE has moved into the SLC area. In operation 740, if the threshold has been reached, MBAP controller may switch UE to a cluster transceiver beam, or allow data transmission between cluster transceiver and UE. Non-limiting examples of decisions may be: i) 50 UE data frames may be observed and 20% or more produced "hits" so the UE may be considered in the SLC area and the UE may be moved to the Cluster beam. ii) 50 UE data frames have been observed and only 2% produced "hits" so the UE may not be moved. The specific values and the thresholds and averaging window may be field adjustable numbers.

Figure 7:
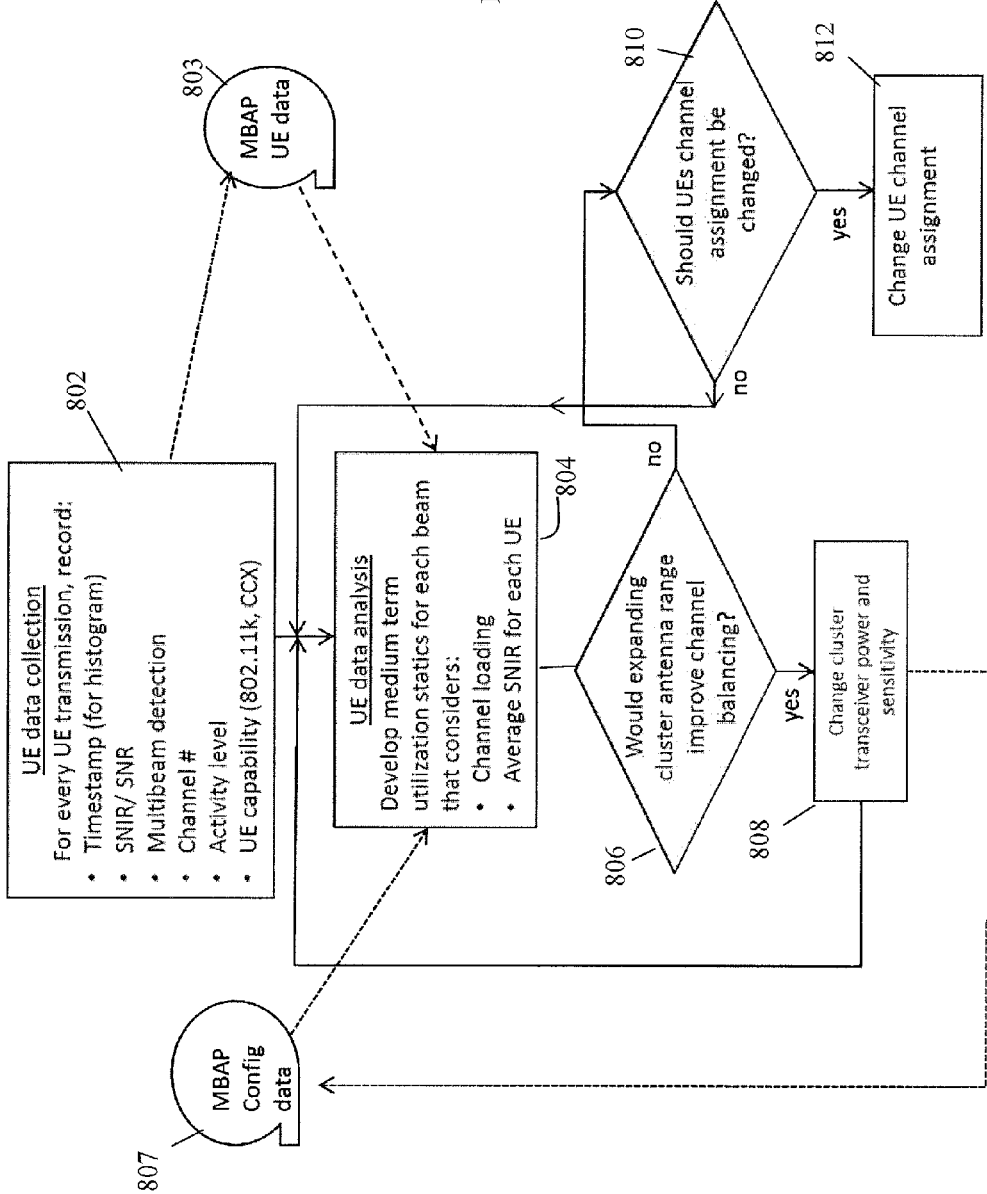
FIG. 7 is a flowchart of a method for changing the range of the cluster transceiver, according to embodiments of the invention.

FIG. 7 is a flowchart of a method for changing the range of the cluster transceiver, according to embodiments of the invention. In operation 802, the MBAP controller may collect and log key metrics of all UEs supported by the MBAP. The data logged may include: time stamp, SINR/SNR (Signal to Interference plus Noise Ratio), SLC area hit or miss, channel number, activity level of UE, or UE capability (802.11k, 802.11r, CCX, etc.), for example. The MBAP controller may store the information in a memory for MBAP UE data 803.

Periodically, e.g., every minute or every 30 seconds, for example, the UE Assignment Algorithm as shown in 804-812 may be executed.

In operation 804, an algorithm may examine the collected data to determine longer term trends on a UE. A series of statistics may be developed to optimize the stability of the reassignment algorithms. The algorithm may develop medium term utilization statistics for each beam that considers channel loading, average SNIR for each UE, or other statistics.

In operation 806, the MBAP may consider whether to change the coverage of the cluster transceiver by increasing or decreasing the transceiver power and the sensitivity of the receiver, so as to maintain uplink/downlink ratios used on other beams. (However, the cluster transceiver coverage may not be reduced below what is required to fully blanket the SLC area). If a cluster antenna pattern change is desired, cluster transceiver power and sensitivity may be changed in operation 808 and parameters for the change may calculated and sent to the cluster transceiver. Additionally the MBAP configuration file may be updated with this new configuration data and operation 804 may be executed with the changed configuration data.

If a cluster antenna pattern change is not required, then in operation 810, the MBAP may consider whether the UE's channel assignment needs to be changed based on data from operation 804. In operation 812, the UE channel assignment may be changed if the data supports this decision. If the data does not mandate a change in the UE channel assignment, analysis of UE data may continue in operation 804.

Figure 8:
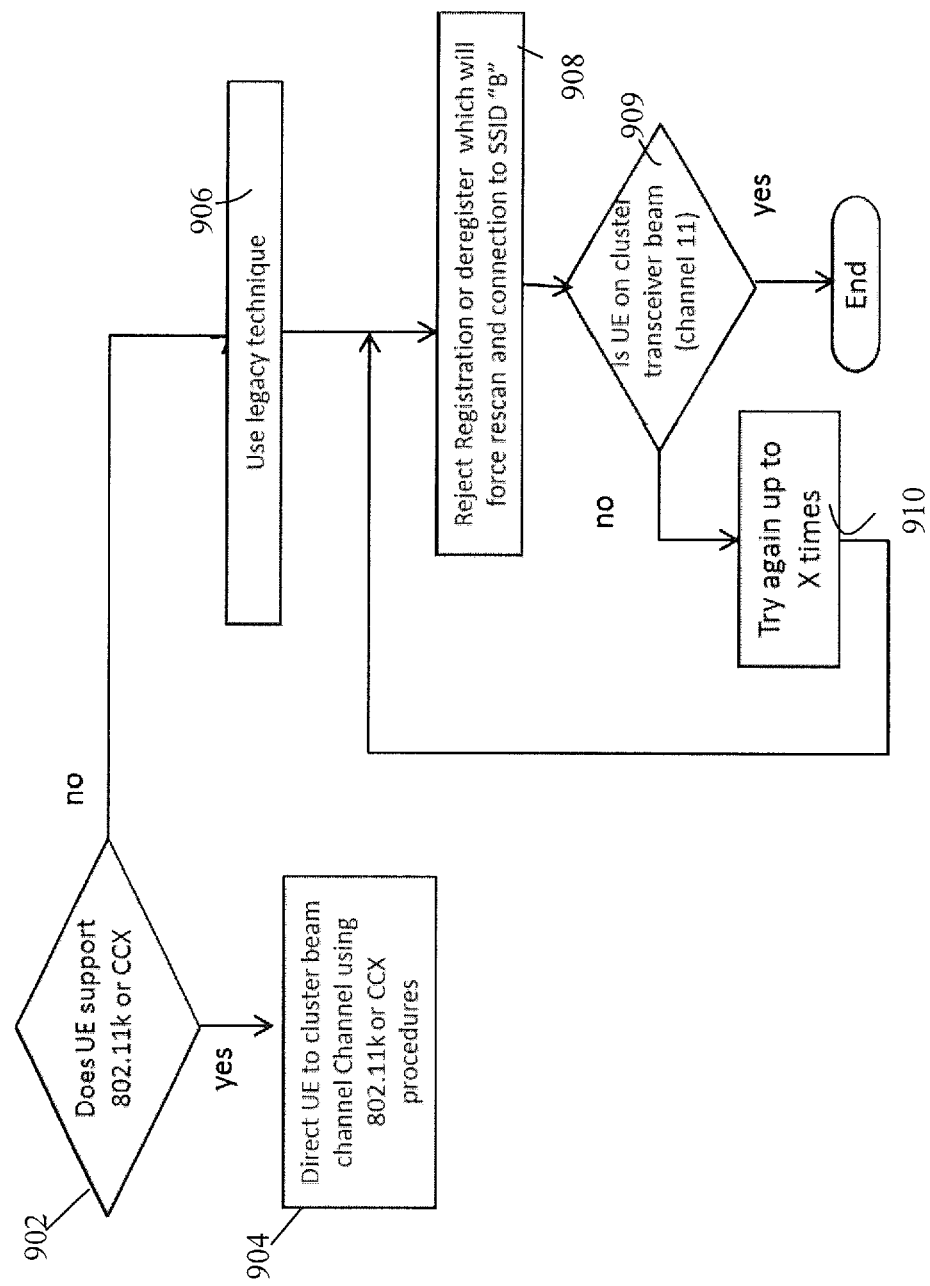
FIG. 8 is a flowchart of a method describing a UE channel reassignment process, according to embodiments of the invention.

FIG. 8 is a flowchart of a method describing a UE channel reassignment process, according to embodiments of the invention. This routine may be used when MBAP determines that UE is in an SLC or detected by two or more beamforming transceivers. The method may be used periodically when the MBAP's trend analysis indicates that channel rebalancing could improve overall MBAP performance.

In operation 902, MBAP controller may determine if the UE is IEEE 802.11k and CCX (Cisco Compatible Extensions) capable. These protocols may be designed to aid in UE assignments to the appropriate transceivers so as to improve resource management. If UE is 802.11k and CCX compatible, the processor may allow the UE to register with the cluster transceiver and allow the cluster transceiver to transmit data to the UE in accordance with a standard protocol defined by IEEE 802.11k or CCX.

For legacy UE (those that are neither 802.11k or CCX compatible) a deregistration message may be sent to the UE in operation 906. This message may cause the UE to scan for a new connection in operation 908. In operation 909, the controller may determine whether UE is on the cluster transceiver beam. If the UE was being served by one of the multibeams, it would have been connected to primary SSID "A". Having been deregistered from primary SSID "A" the UE may look for another SSID in its preferred network list. Secondary SSID "B" may be in the UEs preferred network list and is being used as the second SSID by the cluster antenna. The transition from SSID "A" to SSID "B" and vice versa may occur with less service disruption if the UE is 802.11r capable. If UE fails to register on the cluster transceiver channel, MBAP may continue to attempt registration of UE on the cluster transceiver in operation 910.

The above approach may enable all UE to be moved out of SLC conditions on to the Cluster antenna as well as being move on to the Cluster antenna as part of channel load balancing.

In the event a legacy UE has been moved into an expanded Cluster Beam area and the MBAP controller would like that UE back on the multibeam, the UE can be "coaxed" to move by the MBAP lowering the power on the Cluster Beam.

It is also possible, by repeating rejection, to move the legacy UE to a different multibeam. This can be accomplished by continuing to reject registration request from the UE until it request registration on the AP channel desired by the MBAP controller. This repeated registration rejection method will not in general be used and only the UE that are either 802.11k or CCX capable will be directly assigned to beams by the MBAP controller FIG. 9 is a flowchart of a method according to embodiments of the invention. In operation 10, a user equipment device may transmit data to at least one of plurality of co-located beamforming transceivers. The beamforming transceivers may be part of a multibeam access point and may communicate with UE according to a CSMA/CA protocol, such as IEEE 802.11 for example. In operation 12, a multibeam access point processor or controller may monitor whether at least two of the beamforming transceivers have detected the user equipment on a first channel. This may be an indication that the UE is in a side-lobe contamination area, where conflicting transmission between UE's and the beamforming transceivers may cause inefficiencies. In operation 14, the processor may allow data transmission between the user equipment and a cluster transceiver on a second channel, based on the monitoring. The processor may, for example, reject a registration request from the UE to one of the beamforming transceivers, so that UE may request registration with the cluster transceiver.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

In various embodiments, computational modules may be implemented by e.g., processors (e.g., a general purpose computer processor or central processing unit executing software), or digital signal processors (DSPs), or other circuitry. The baseband modem may be implanted, for example, as a DSP. A beamforming matrix can be calculated and implemented for example by software running on general purpose processor. Beamformers, gain controllers, switches, combiners, and phase shifters may be implemented, for example using RF circuitries.

An additional benefit of the invention is the possibility of increasing the utilization of limited radio channels by organizing UE on different radio channels by the quality of their connection to the AP thus increasing the utilization of the radio environment. Specifically the quality of the signal from the UE is measured by the AP and those UEs with stronger signals are assigned to a radio channel with an antenna that has a lower gain and broad azimuth coverage, while the weaker signals are assigned to a higher gain more directional antenna.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A wireless communication system comprising:
 a plurality of co-located, beamforming transceivers, each configured to transmit data to a user equipment on a first channel and associated with a respective directive antenna beam;
 a cluster transceiver co-located with the beamforming transceivers, configured to transmit data to the user equipment on a second channel, wherein the cluster transceiver is associated with an antenna pattern having a wider azimuth and lower power than the directive antenna beams respectively associated with each of the plurality of beamforming transceivers; and
 a processor to:
  monitor whether at least two of the beamforming transceivers have detected data transmission from the user equipment, and
  based on the monitoring, allow the cluster transceiver to transmit data to the user equipment.

2. The wireless communication system of claim 1, wherein the processor is to determine whether at least two of the beamforming transceivers have detected data transmission from the user equipment by determining whether at least two of the beamforming transceivers detect a registration request from the user equipment.

3. The wireless communication system of claim 2, wherein the processor is to reject the registration request if at least two beamforming transceivers detect the registration request.

4. The wireless communication system of claim 2, wherein the processor is to accept the registration request if only one of the beamforming transceivers detects the registration request.

5. The wireless communication system of claim 1, wherein the processor is to track a number of times in a predetermined time period that at least two of the beamforming transceivers have detected data transmission from the user equipment.

6. The wireless communication system of claim 5, wherein the processor is to allow the cluster transceiver to transmit data to the user equipment if the tracked number of times is greater than a threshold.

7. The wireless communication system of claim 1, wherein the beamforming transceivers maintain a primary service set identification and the cluster transceiver maintains a secondary service set identification.

8. The wireless communication system of claim 1, wherein the processor is to allow the cluster transceiver to transmit data to the user equipment in accordance with a standard protocol defined by IEEE 802.11k or CCX.

9. A method of wireless communication, comprising:
 transmitting data, by a user equipment, to at least one of a plurality of co-located beamforming transceivers, each of said beamforming transceivers associated with a respective directive antenna beam;
 monitoring whether at least two of the beamforming transceivers have detected the user equipment on a first channel; and
 based on the monitoring, allowing data transmission between the user equipment and a cluster transceiver on a second channel, wherein the cluster transceiver is associated with an antenna pattern having a wider azimuth and lower power than the directive antenna beams respectively associated with each of the plurality of beamforming transceivers.

10. The method of claim 9, wherein monitoring whether at least two of the beamforming transceivers have detected the user equipment comprises determining whether at least two of the beamforming transceivers detect a registration request from the user equipment.

11. The method of claim 10, comprising rejecting the registration request if at least two of the beamforming transceivers detect the registration request.

12. The method of claim 11, comprising allowing registration if only one of the beamforming transceivers detects the registration request.

13. The method of claim 12, comprising tracking a number of times in a predetermined time period that at least two beamforming transceivers can detect the user equipment in a predetermined time period.

14. The method of claim 13, comprising allowing the cluster transceiver to transmit data to the user equipment if the tracked number of times is greater than a threshold.

15. The method of claim 9, comprising maintaining, by the beamforming transceivers, a primary service set identification, and maintaining, by the cluster transceiver, a secondary service set identification.

16. The method of claim 15, wherein allowing data transmission between the user equipment and a cluster transceiver on a second channel comprises accepting a registration request by the user equipment on the secondary service set identification.

17. The method of claim 9, comprising allowing data transmission between the user equipment and a cluster transceiver on a second channel in accordance with a standard protocol defined by IEEE 802.11k or CCX.

18. A multibeam access point device, comprising:
 a plurality of beamforming access points to transmit data to a user equipment on one channel, each of said beamforming access points associated with a respective directive antenna beam;

a cluster access point to transmit data to the user equipment on a second channel, wherein the cluster transceiver is associated with an antenna pattern having a wider azimuth and lower power than the directive antenna beams respectively associated with each of the plurality of beamforming transceivers; and a controller to allow registration of the user equipment with the cluster access point if at least two of the beamforming access points detect a registration request from the user equipment.

19. The multibeam access point device of claim 18, wherein the controller is to reject a registration request from the user equipment to a beamforming access point if at least two of the beamforming access points detect the registration request from the user equipment.

20. The multibeam access point device of claim 18, wherein the plurality of beamforming access points each store a primary service set identification and the cluster access point stores a secondary service set identification.

21. The multibeam access point device of claim 20, wherein the controller is to accept a registration request from the user equipment to the cluster access point on the secondary service set identification.

22. The multibeam access point device of claim 18, wherein the controller is to track a number of times in a predetermined time period that at least two of the beamforming access points have detected data transmission from the user equipment.

* * * * *